United States Patent [19]

Nomura et al.

[11] Patent Number: 5,745,664
[45] Date of Patent: Apr. 28, 1998

[54] IMAGE SYNTHESIZING METHOD AND IMAGE RECORDING APPARATUS WHICH ELECTRONICALLY SYNTHESIZES AN IMAGE WITH A PAGE OF INFORMATION

[75] Inventors: Takakazu Nomura, Tokyo; Eiji Sawamura, Yokohama; Hiroshi Hosaka, Tokyo; Soukichi Araki, Yokohama; Yoshimasa Honda, Sagamihara; Shinji Imoto, Yokohama; Ryuzo Nitta, Funabashi, all of Japan

[73] Assignee: Ricoh Company, Ltd., Tokyo, Japan

[21] Appl. No.: 653,701

[22] Filed: May 23, 1996

Related U.S. Application Data

[63] Continuation of Ser. No. 340,402, Nov. 15, 1994, abandoned.

[30] Foreign Application Priority Data

Nov. 15, 1993 [JP] Japan ................................. 5-308756

[51] Int. Cl.⁶ .................................................. H04N 1/387
[52] U.S. Cl. ........................ 395/117; 395/782; 382/282; 382/284; 358/450; 358/453
[58] Field of Search ...................... 358/450, 451, 358/453, 538; 382/284, 282, 287; 395/117, 782, 779, 146, 768, 769

[56] References Cited

U.S. PATENT DOCUMENTS

| 4,542,378 | 9/1985 | Suganuma et al. | 358/450 |
|---|---|---|---|
| 4,608,662 | 8/1986 | Watanabe et al. | 395/782 |
| 4,641,197 | 2/1987 | Miyagi | 358/450 |
| 5,204,946 | 4/1993 | Shimamura | 395/146 |

Primary Examiner—Scott A. Rogers
Attorney, Agent, or Firm—Oblon, Spivak, McClelland, Maier & Neustadt, P.C.

[57] ABSTRACT

The image recording apparatus optically reads image data on a document with an image area or a plurality of image areas specified therein and synthesizes image data of another document read subsequently into the specified image area or image areas changing the size thereof as needed accordingly an image on the other document can be allocated with a desired size at an arbitrary position on the first document and printed on a sheet of recording paper, thus improving the work efficiency and convenience of the apparatus.

34 Claims, 10 Drawing Sheets

IMAGE SYNTHESIZING METHOD AND IMAGE RECORDING APPARATUS WHICH ELECTRONICALLY SYNTHESIZES AN IMAGE WITH A PAGE OF INFORMATION

This application is a Continuation of application Ser. No. 08/340,402, filed on Nov. 15, 1994, now abandoned.

FIELD OF THE INVENTION

The present invention relates to an image synthesizing method for a copying machine, a facsimile device, a printing machine or the like and an image recording apparatus, and more particularly to an image synthesizing method and an image recording apparatus which allow simple operations for synthesizing images.

BACKGROUND OF THE INVENTION

In recent years, in association with rapid and evolutionary improvement in the fields of image memory technology, image recognition technology, image color recognition/discrimination technology, especially in the field of image synthesizing apparatus such as a copying machine, it has become possible to specify an image area by using a line marker or the like or to execute independent magnification or reduction of image size by specifying a required size using a ten keypad, a digitizer or the like. Especially in association with progress in the field of digital technology, image recording apparatuses such as copying machines have been becoming more and more diversified.

With the conventional type of image recording apparatus as described above, however, when it is necessary to allocate an image on another document at an arbitrary position of a particular document with an arbitrary size and to print the image on a sheet of recording paper, it is required to copy the image on another document with a desired size and then cut and adhere the copied image at a desired place. This work is very complicated and the image recording apparatuses are disadvantageously inconvenient in use.

Also in a work for preparing a general document, when preparing a document including figures, graphs, tables and the like, the necessity for cutting and adhering images is frequently generated, so that the work efficiency is very low and technological improvement to overcome the problems as described above has been desired. In addition, cutting and adhering documents result in waste of paper resources, which is also disadvantageous.

SUMMARY OF THE INVENTION

It is an object of the present invention to make it possible to allocate an image on another document at an arbitrary position on a particular document with a desired size and to print the image on a sheet of recording paper with improved work efficiency as well as improved convenience in use.

In an image synthesizing method according to the present invention, an image on another document is allocated with a desired size at an arbitrary position on a particular document and printed on a sheet of recording paper by reading the particular document with an image area specified therein and synthesizing the image on the other document subsequently read with the desired size in the specified image area of said particular documents without cutting or adhering the image.

In an image synthesizing method according to the present invention, a plurality of images on a plurality of documents are allocated with desired sizes at arbitrary positions on a particular document and printed on a sheet of recording paper by reading the particular document with a plurality of image areas specified therein and then synthesizing the plurality of images read from the plurality of documents with the desired sizes in the plurality of specified image areas of the particular documents according to a specified order and without cutting or adhering the images. The invention also includes a corresponding image forming apparatus.

Other objects and features of this invention will become understood from the following description with reference to the accompanying drawings.

DESCRIPTION OF THE PREFERRED EMBODIMENTS

Detailed description is made hereinafter for a case in which an image synthesizing method and an image recording apparatus according to the present invention are applied to a copying machine with reference to the related drawings in the order of Embodiment 1 and Embodiment 2.

In Embodiment 1, a document with a plurality of image areas specified therein (described as a particular document hereinafter) is read, and then image data of a plurality of documents read subsequently is changed in size according to the necessity and then synthesized in the plurality of image areas specified above according to a specified order.

Figure 1:
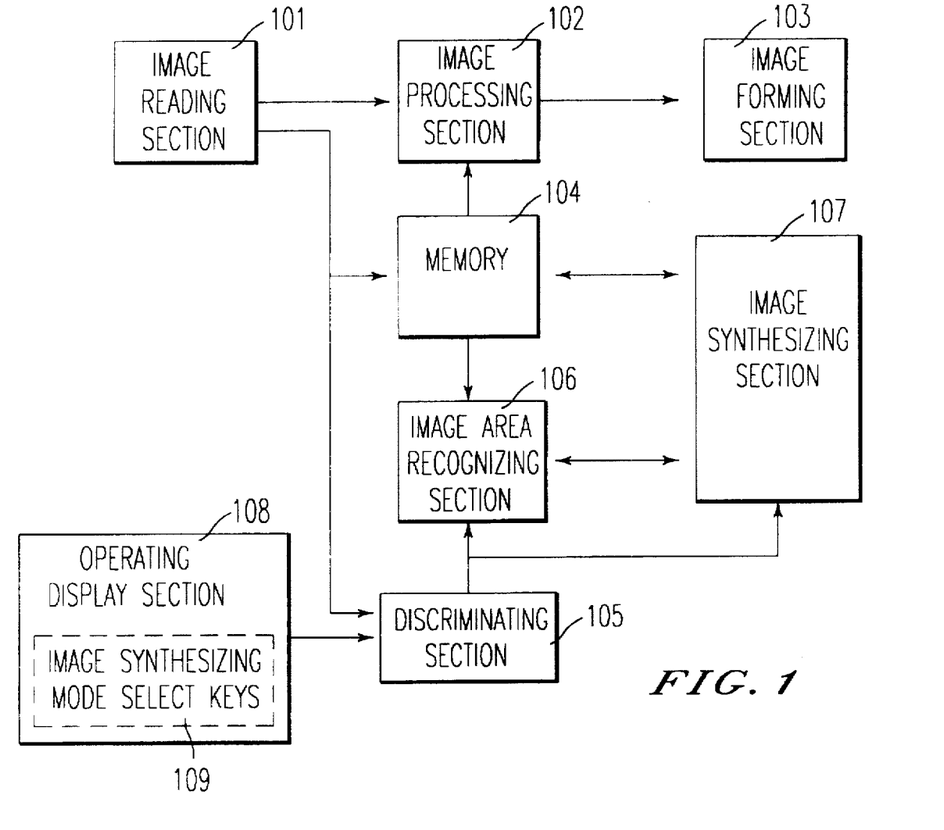
FIG. 1 is a block diagram illustrating a copying machine according to Embodiment 1 of the present invention.

FIG. 1 is a block diagram of a copying machine according to Embodiment 1. The copying machine comprises an image reading section 101 for optically reading image data from a document, an image processing section 102 for executing prespecified processing on the image data read by the image reading section 101, an image forming section 103 for forming an image on recording paper according to the image data inputted from the image processing section 102, a memory 104 for storing therein the image data read by the image reading section 101, a discriminating section 105 for making a determination as to whether the image data read by the image reading section 101 is that of a particular document or not, an image area recognizing section 106 for recognizing positions and sizes of a plurality of image areas prespecified on the particular document when it is determined by the discriminating section 105 that the image data is that from the particular document. There is an image synthesizing section 107 for synthesizing image data subsequently read by the image reading section 101, when it is determined by the discriminating section 105 that the image data is that from the particular document, with the image data of the particular document stored in the memory 104 by matching the former image data to the plurality of image areas described above according to a prespecified order and also changing the size of the image data subsequently read according to sizes and positions of the matched image areas. There is also an operating display section 108 for executing various types of operations.

It should be noted that in the operating display section 108 are provided image synthesizing mode select keys 109 for selecting an image synthesizing mode for synthesizing images by arranging an image on another document at an arbitrary position on the particular document.

The discriminating section 105 makes a determination as to whether a prespecified pattern (bar code in this embodiment) is included in the image data inputted from the image reading section 101 or not by way of pattern matching and determines, when the pattern is detected, that the image data is that of the particular document, and also determines, after the image synthesizing mode select key 109 is selected, that the first image data read by the image reading section 101 is that of the particular document.

Figure 2:
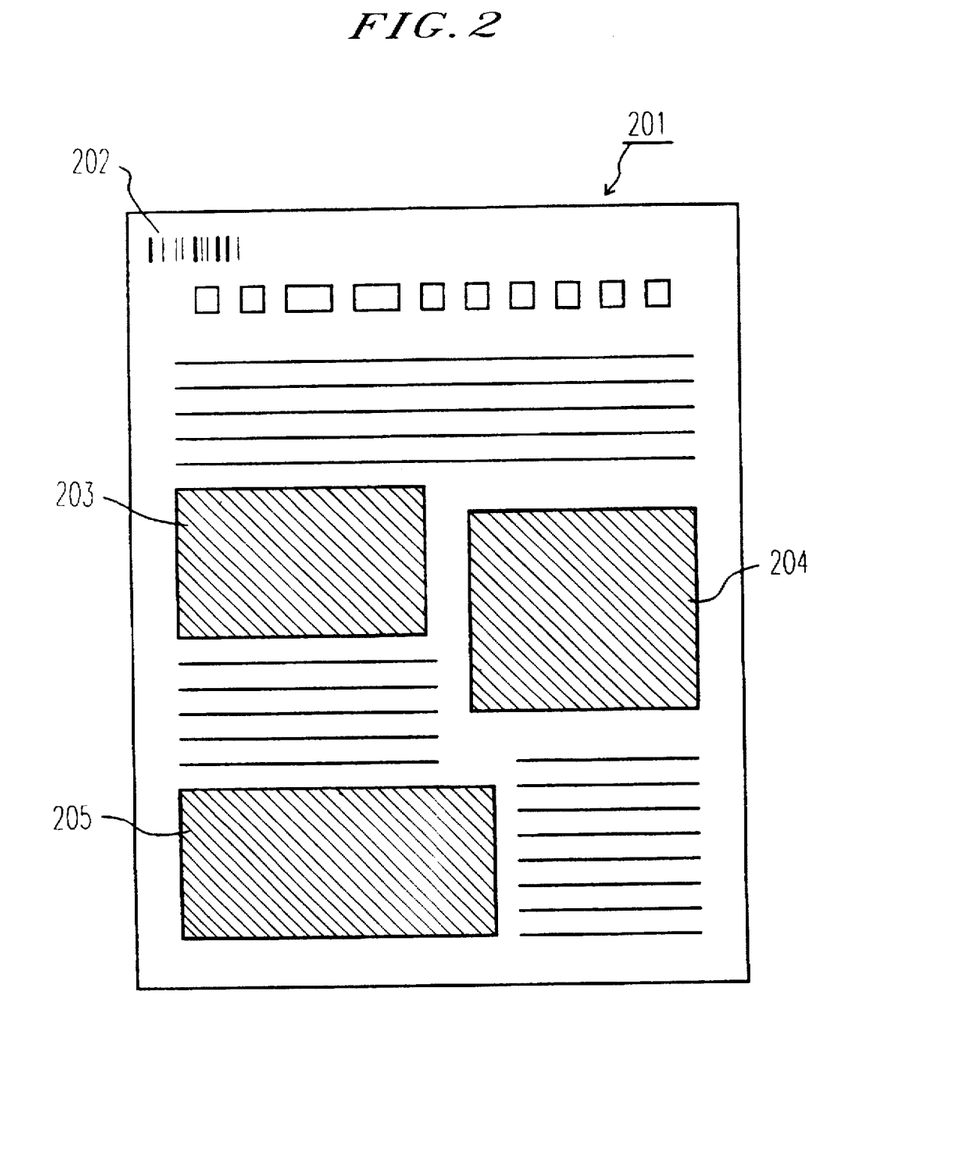
FIG. 2 is an explanatory view demonstrating a particular document in Embodiment 1.

Next, a detailed description is made for the particular document with reference to FIG. 2. The particular document is a document having a plurality of image areas specified therein. For instance, in FIG. 2, each of the image areas 203, 204, 205 indicated by slash lines in the particular document 201 is specified as a rectangular area. There is no specific restriction for any portion other than the image areas 203 to 205, and a normal image comprising, for instance, letters, pictures, and graphics is allocated outside of the region 203–205. It should be noted that number and positions of the image areas are arbitrary.

Also in this figure, the reference numeral 202 indicates a bar code for identifying the particular document. When the image synthesizing mode is an automatic discriminating mode, the discriminating section 105 determines whether a document with the bar code 202 assigned thereto is the particular document which will be used in image systhesizing.

Also it should be noted that in the automatic discriminating mode, one of the image synthesizing modes, each time a document is read by the image processing section 102, the read image data is inputted into the discriminating section 105, the discriminating section makes a determination as to whether the inputted image data is that of the particular document or not, and the image synthesizing mode is automatically executed if the image data is that of the particular document. It should be noted that, in Embodiment 1, the automatic discriminating mode is effected except when any other image synthesizing mode is selected with the image synthesizing mode select key 109 described above.

With the configuration described above, next description is made for ① operations in the automatic discriminating mode, one of the image synthesizing modes, and ② operations according to specifications input by the image synthesizing mode select keys.

① Operations in automatic discriminating mode, one of the image synthesizing modes In the copying machine according to Embodiment 1 0of the present invention, in the automatic discriminating mode, image data read by the image reading section 101 is sent to the image processing section 102, the memory 104, and the discriminating section 105.

When the image data is inputted, the discriminating section 105 makes a determination as to whether the bar code 202 is included in the image data, determines, when the bar code 202 is detected in the image data, that the image data is that of the particular document, and notifies the image processing section 102, image area recognizing section 106, and image synthesizing section 107 of the necessity of executing the image synthesizing mode.

When notified of the necessity of executing the image synthesizing mode, the image area recognizing section 106 extracts image areas (203 to 205 in FIG. 2) from the image data of the particular document stored in the memory 104, and recognizes the positions (addresses) and the sizes of the areas. Herein, extraction of the image areas can be executed by using the closed loop detection technique which is a known technology. For instance, a closed loop with a size equal to or larger than a specified one, inside of which is an empty area (all blank data), can be extracted as an image area.

On the other hand, when notified of the necessity of executing the image synthesizing mode, the image processing section 102 stops image processing.

Then, when it is determined by the discriminating section 105 that the image data is that of the particular document and the image synthesizing mode is executed, the image synthesizing section 107 executes the image synthesizing processing in which, after the image synthesizing mode is executed, the image data read by the image reading section 101 is matched to the plurality of image areas shown in FIG. 2 according to a specified order and then synthesized.

Figure 3A:
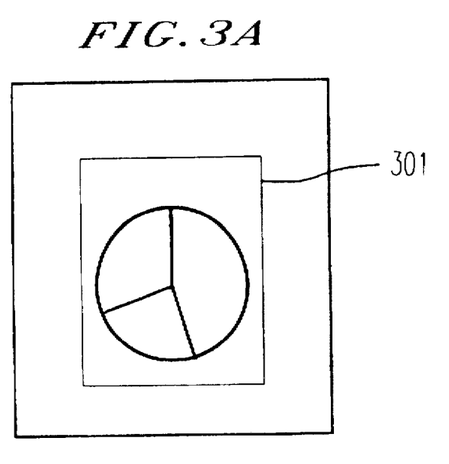
FIG. 3A is an explanatory view demonstrating document to be synthesized in Embodiment 1.
Figure 3B:
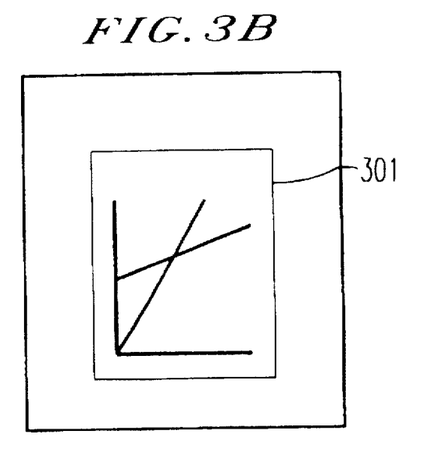
FIG. 3B is an explanatory view demonstrating document to be synthesized in Embodiment 1.
Figure 3C:
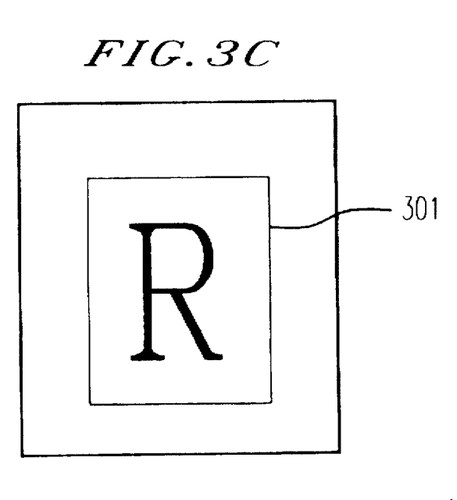
FIG. 3C is an explanatory view demonstrating document to be synthesized in Embodiment 1.

Next, a description is made for a case where, for instance, documents shown in FIG. 3A to FIG. 3C are read in the order of Document 1 to Document 3 by the image reading section 101. Document 1 is illustrated in FIG. 3A, document 2 is illustrated in FIG. 3B, and document 3 is illustrated in FIG. 3C.

By referring the bar code 202 of the particular document as a reference position, the shorter direction of this document is regarded as the X direction with the longitudinal direction thereof regarded as the Y direction, and it is recognized that, the larger the distance from the bar code 202 is, the larger the X and Y coordinate values become respectively.

In this embodiment, image data successively read is matched from an image area having a smaller Y coordinate value of a position (address) to that having a larger Y coordinate value among the image areas 203 to 205 shown in FIG. 2 respectively. For this reason, when Document 1 shown in FIG. 3A is read by the image reading section 101, Document 1 is matched to the image 203. Image data of Document 1 read as described above is sent to the image recognizing section 106, and only the image data within a prespecified image input frame 301 shown in FIGS. 3A–3C is separated as image data to be synthesized.

Then, the image synthesizing section 107 executes independent size adjustment of the image data separated for synthesizing according to a size (sideward and longitudinal dimensions) of the image area 203 as well as size (sideward and longitudinal dimensions) of the image input frame 301, and the image data for synthesizing is synthesized with the image area 203 on the memory 104.

Similarly, the image data for synthesizing separated from Document 2 is synthesized with the image area 204, and the image data for synthesizing separated from Document 3 is synthesized with the image area 205.

As described above, when all the image data has been synthesized with all the image areas, or when a specified output key (not shown herein) provided on the operating display section 108 is pressed down, the image synthesizing section 107 outputs a synthesized image stored in the memory 104 via the image processing section 102 and the image forming section 103 onto recording paper. It should be noted that, although the description of this embodiment above assumes that the Y coordinates of the image areas 203 to 205 are different, if the Y coordinates of a plurality of image areas are identical, image data read as described above is matched from an image area having to a smaller X coordinate to those having larger X coordinates respectively by comparing Y coordinates of the image areas having the same X coordinate value.

Also it should be noted that, although coordinate values of each image area are recognized by referring to the bar code 202 of the particular document in this embodiment, any other specific marking may be used in place of a bar code as a reference point.

Furthermore, if the way to place the particular document on a contact glass of a copying machine is specified to users of the copying machine, one edge section of the particular document may be used as a reference point for recognizing an address of each image area.

Figure 4A:
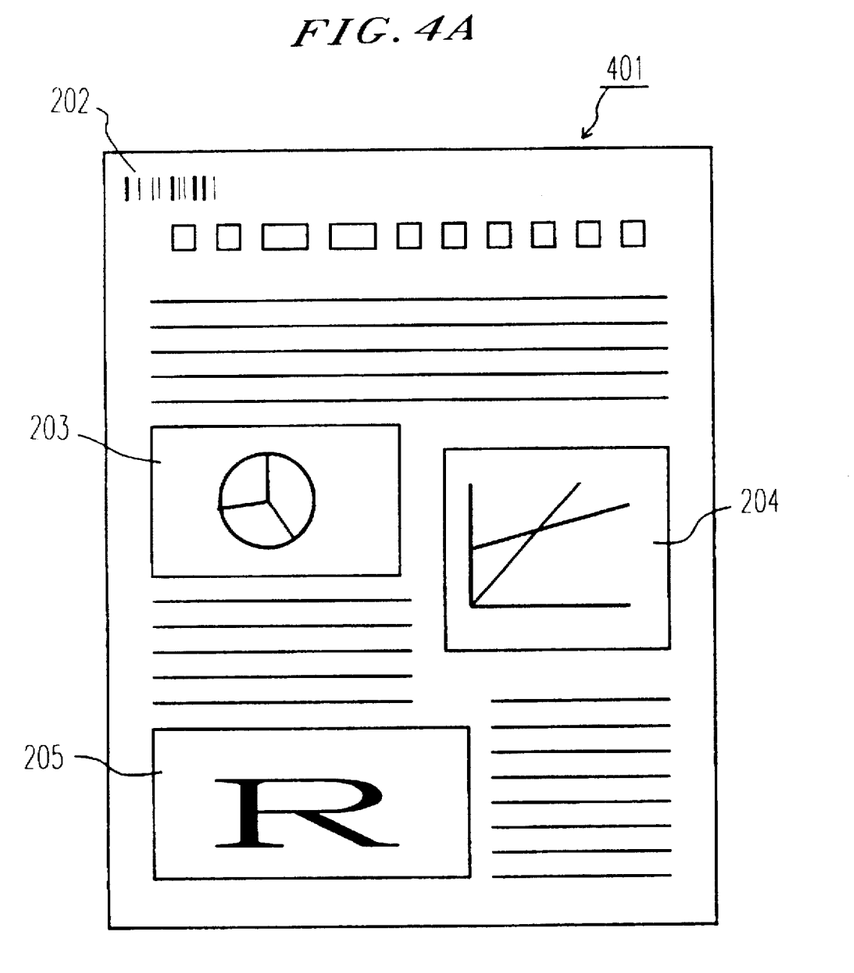
FIG. 4A is an explanatory view demonstrating an example of output image formed by synthesizing a plurality of images with the sizes changed independently in Embodiment 1.
Figure 4B:
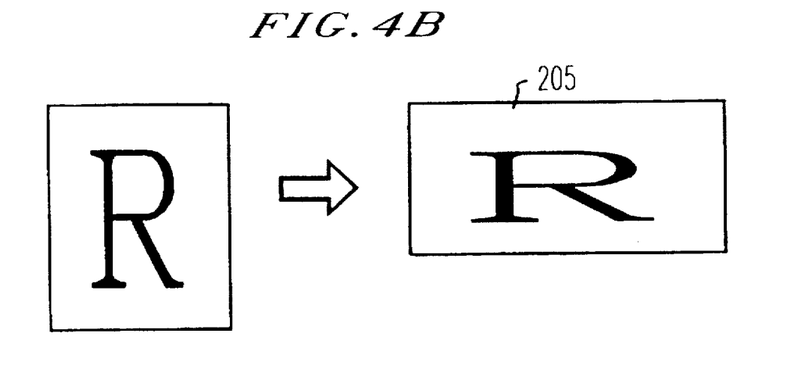
FIG. 4B is an explanatory view demonstrating an example of output image formed by synthesizing a plurality of images with the sizes changed independently in Embodiment 1.

FIG. 4A shows an output image 401 formed by synthesizing Document 1 to Document 3 shown in FIG. 3A–3C respectively with the image areas 203 to 205 of the particular document shown in FIG. 2. As described above, image synthesizing is executed by changing the size of each image independently, so that the images can be synthesized with the entire image areas specified beforehand. However, as shown in FIG. 4B, if a ratio of the longitudinal dimension vs the sideward dimension of image data for synthesizing is extremely different from that of an image area, distortion of the synthesized image becomes remarkable. To overcome this problem, an image area should be set up previously so that the ratio of the image area will be close to that of the image to be synthesized therein.

Figure 5A:
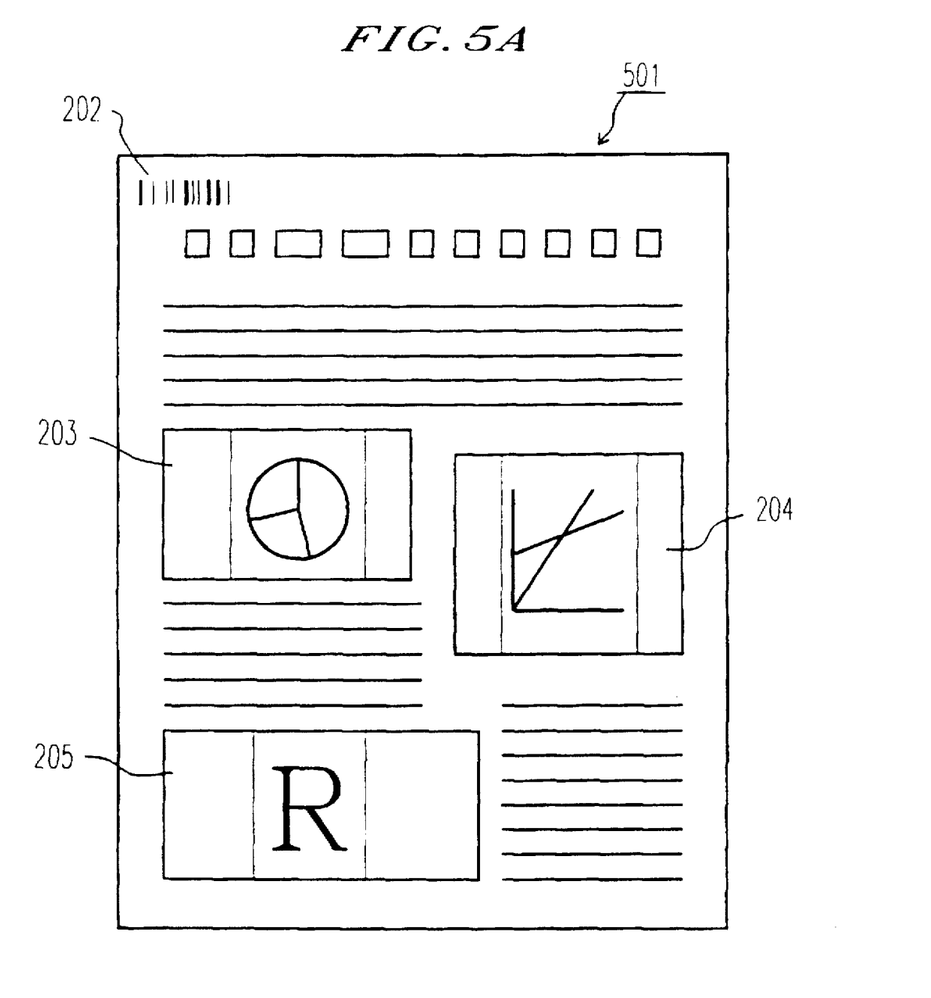
FIG. 5A is an explanatory view demonstrating an example of output image formed by synthesizing a plurality of images with the sizes changed independently.
Figure 5B:
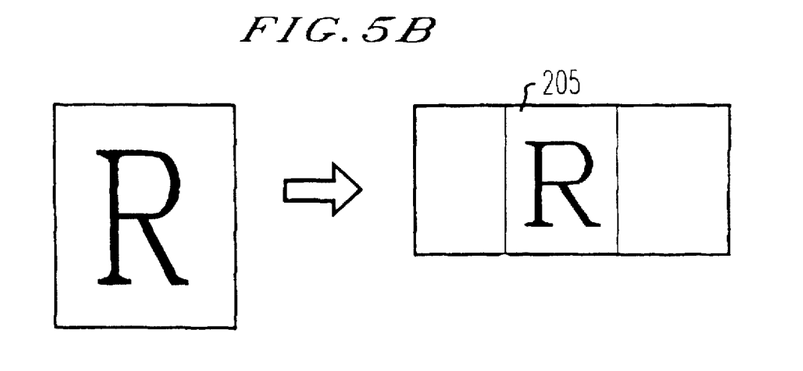
FIG. 5B is an explanatory view demonstrating an example of output image formed by synthesizing a plurality of images with the sizes changed independently.

Instead of synthesizing images by changing the size of each image or each image area independently, by synthesizing images and keeping the ratio of longitudinal dimension vs sideward dimension at a constant value, it is possible to synthesize images faithfully keeping the practical appearance of the image data for synthesizing. FIG. 5A shows an output image 501 with the size changed. In this case, as shown in FIG. 5B, a blank section with no data printed therein is generated in the longitudinal direction or the sideward direction of this image area, and if it is necessary to prevent generation of the blank section, the image areas should be set up previously so that the ratio of longitudinal dimension vs sideward dimension thereof will be close to that of the image to be synthesized therein.

② Operations with the image synthesizing mode select key.

The following description is made for operations when the image synthesizing mode is selected by pressing down the image synthesizing mode select key 109. When the image synthesizing mode select key 109 is pressed down, the operating display section 108 notifies the discriminating section 105 of the necessity of executing the image synthesizing mode. When the discriminating section 105 is notified of the necessity of executing the image synthesizing mode, then the image reading section 101 determines that the image data read at a first time is that of the particular document, and notifies the image processing section 102, the image area recognizing section 106 and the image synthesizing section 107 of the necessity of executing the image synthesizing mode.

Figure 6:
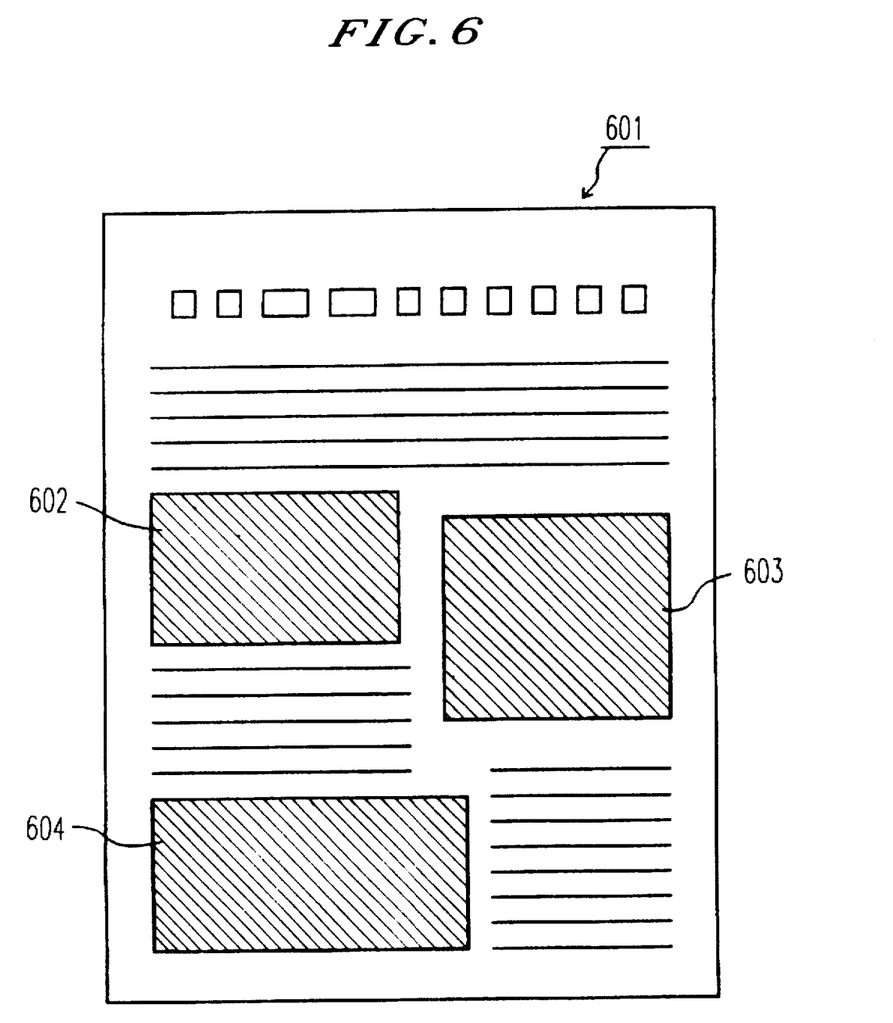
FIG. 6 is an explanatory view demonstrating an example of particular document without any bar code assigned when an image synthesizing mode select key is pressed down in Embodiment 1.

When the image processing section 102, image area recognizing section 105, and image synthesizing section 107 are notified of the necessity of executing the image synthesizing mode, operations similar to those in the automatic determination mode, one of the image synthesizing modes, are executed. With this, the output images as shown in FIG. 4A and FIG. 5A are obtained. However, when the image synthesizing mode select key 109 is pressed down to select the image synthesizing mode, the image reading section 101 determines that the image data read at the first time is that of the particular document. Therefore, it is not always required for a bar code to be assigned to the particular document as shown in FIG. 6, and it is required only that the image areas 602 to 604 have been specified.

As described above, in Embodiment 1, it is possible to allocate an image on another document with a desired size at an arbitrary position of the particular document and print the synthesized image on a sheet of paper so that the work efficiency and convenience in use can substantially be improved.

Also in a job for preparing general documents, even when it is necessary to prepare a document frequently requiring cutting and adhering drawings, graphs, tables and the like, it is possible to copy the document efficiently. Also it is not required to cut and adhere documents, so that waste of valuable paper resources can be reduced.

Embodiment 2 has the same construction as that in Embodiment 1, and in this embodiment the image area recognizing section 106 recognizes, in addition to positions and sizes of a plurality of image areas specified on the particular document, a specified order for synthesizing. Based on this specified order for synthesizing, the image synthesizing section 107 matches image data for synthesizing read subsequently with the plurality of image areas, and also based on the sizes and positions of the matched image areas, the sizes of the image data for synthesizing are changed and the image data is synthesized with the image data of the particular document stored in the memory 104.

Also in Embodiment 1, as shown in FIG. 3A–3C image synthesizing is executed by separating image data within the image input frame 301 specified previously, but in Embodiment 2 image synthesizing is executed by separating image data within a marked area.

It should be noted that basic operations in Embodiment 2 are the same as those in Embodiment 1, so a description is made for different points herein.

Figure 7:
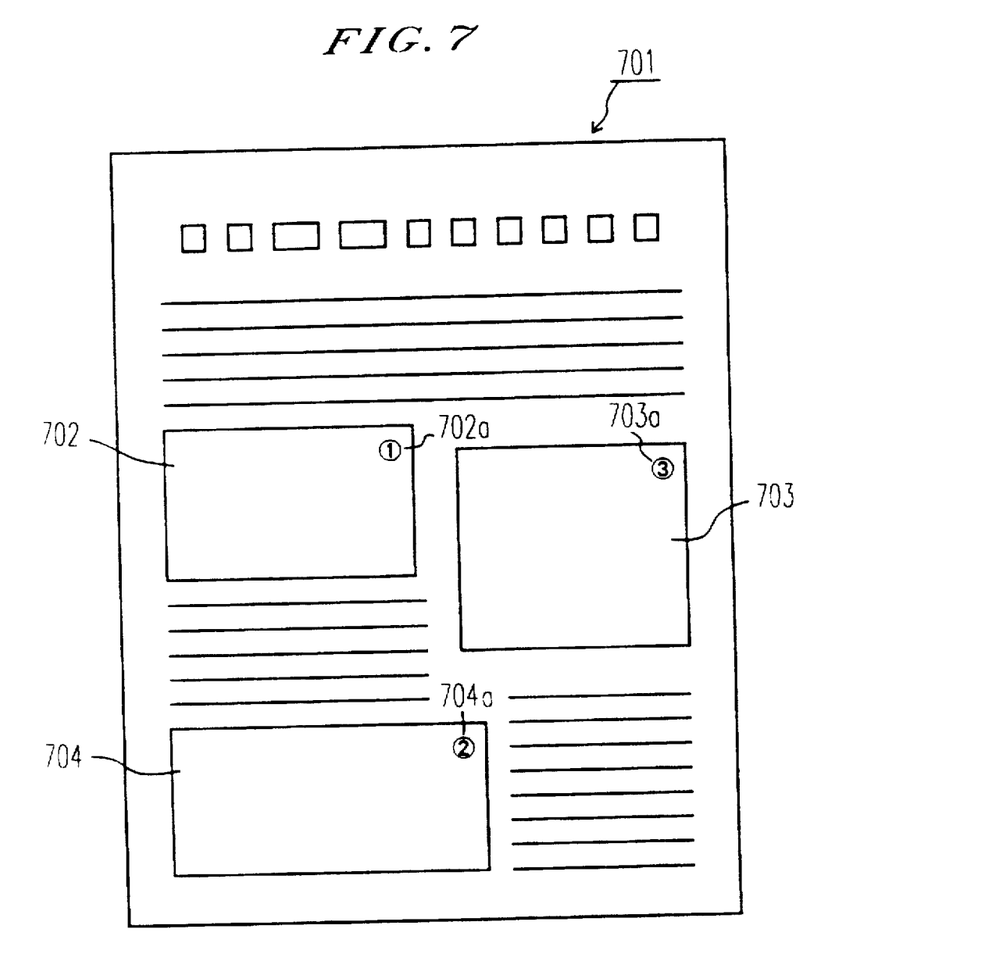
FIG. 7 is an explanatory view demonstrating an example of particular document in Embodiment 2.

FIG. 7 shows an example of the particular document in Embodiment 2. As there is no bar code in FIG. 7, (the image synthesizing mode select key is pressed to select the image synthesizing mode. In the particular document in Embodiment 2 are provided a plurality of image areas 702 to 704, and furthermore specified orders for synthesizing 702a to 704a are assigned to the specified positions (in the left top section herein) within the image areas 702 to 704. ①, ② and ③ indicated by the specified orders for synthesizing 702a to 704a respectively indicate orders in image synthesizing.

When notified of execution of the image synthesizing mode, the image area recognizing section 106 extracts the image areas 702 to 704 from the image data of the particular document 701 stored in the memory 104 and recognizes the positions (addresses) and sizes, and also recognizes the numbers ①, ③, ② indicated by the specified orders for synthesizing 702a to 704a.

Then the image synthesizing section 107 matches the image data read by the image reading section 101, after the image synthesizing mode is executed, to the plurality of image areas shown in FIG. 7 having the numbers ① to ③ designating the specified orders for synthesizing. The image synthesizing section 107 then executes the image synthesizing processing.

Figure 8:
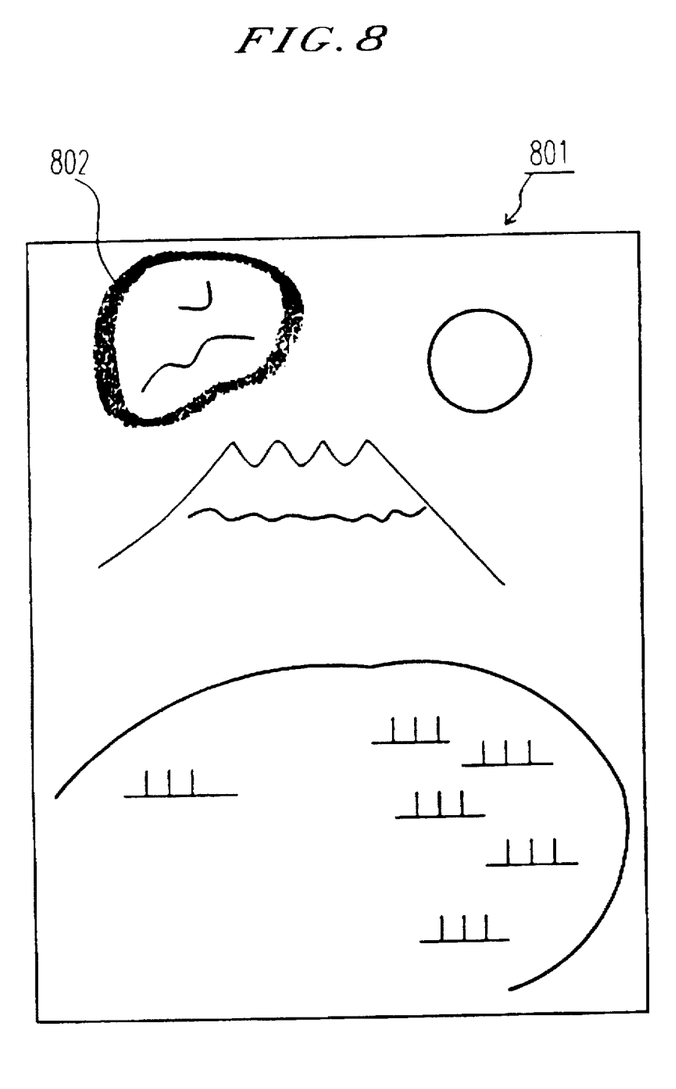
FIG. 8 is an explanatory view demonstrating image data to be synthesized in Embodiment 2.

For example, after the image synthesizing mode is executed, if the document shown in FIG. 8 is read by the image reading section 101, image data within the area marked with a marker is separated as that for synthesizing. The image synthesizing section 107 synthesizes the image data for synthesizing as described above with the image area 702 indicated by the number ①. It should be noted that, in this step, the image synthesizing section 107 adjusts the form of image data for synthesizing into a rectangular area using the longitudinal and sideward maximum addresses, changes the size of the rectangular form, and executes image synthesizing.

Figure 9:
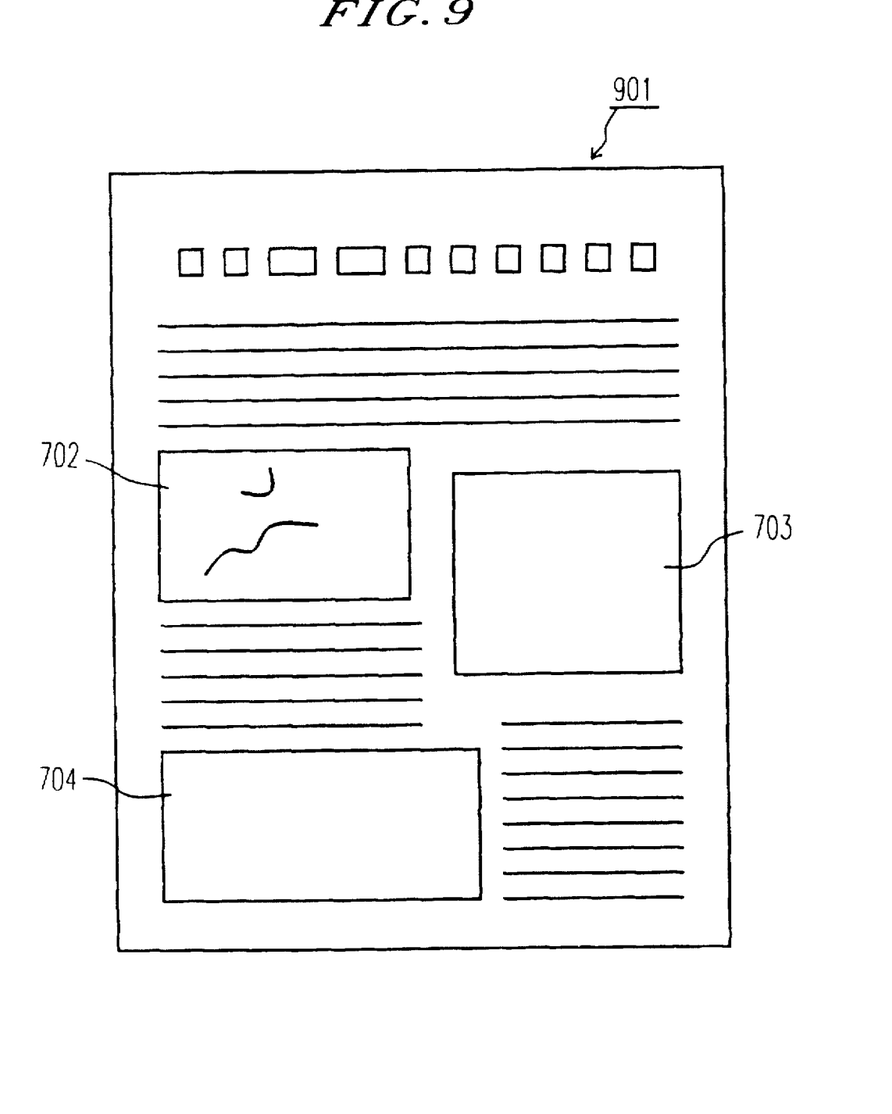
FIG. 9 is an explanatory view demonstrating an example of output image in Embodiment 2.

FIG. 9 shows an output image 901 in the state where a space within the marked area 802 shown in FIG. 8 has been synthesized into image area 702.

With the processing above, in Embodiment 2, in addition to the effects provided in Embodiment 1, it is possible for an operator to freely specify an order of image synthesizing as well as to easily specify image data for synthesizing by using a marker.

Figure 10:
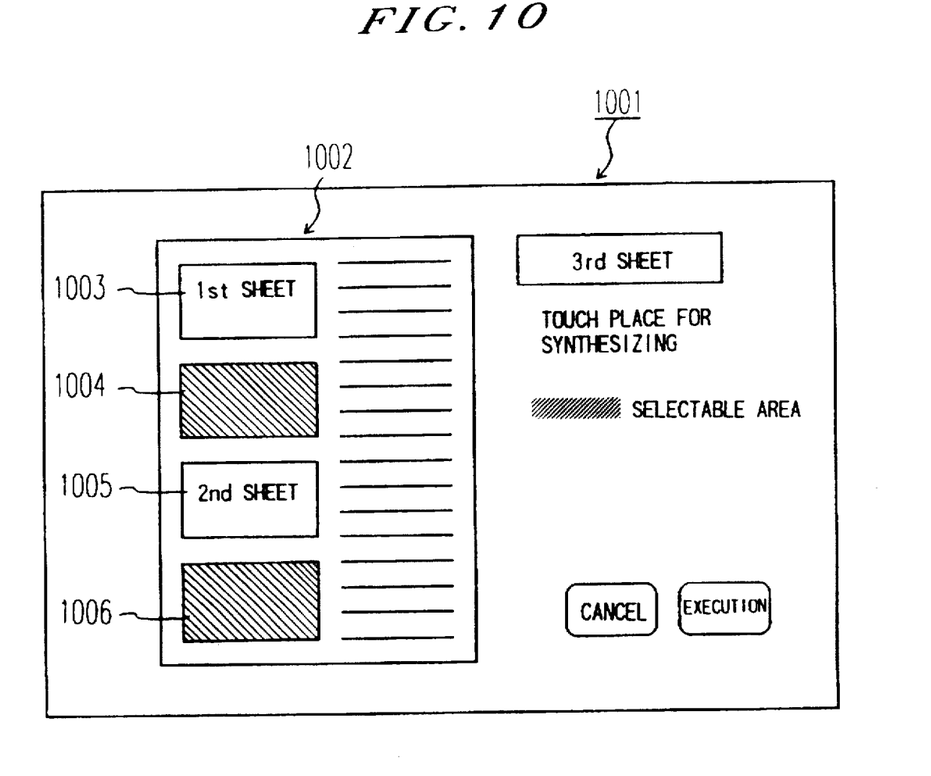
FIG. 10 is an explanatory view illustrating another example of method in which an operator can freely specify a sequence for synthesizing images.

Also as another method of freely specifying an order of image synthesizing, for instance, as shown in FIG. 10, image areas (1003 to 1006 herein) of the particular document 1002 recognized by the image area recognizing section 106 may be displayed on a liquid crystal display panel 1001 in which a touch panel is provided on a liquid crystal display unit so that an operator can freely select a space for synthesizing of image data each time image data is read by the image reading section 101.

As described above, in the image synthesizing method according to the present invention, a document with an area specified therein is read, and image data of other document read subsequently is synthesized with the specified image area with the sizes freely changed, so that an image on another document can be allocated with a desired size at an arbitrary position of a particular document and printed on a sheet of recording paper in order to substantially improve the work efficiency and the convenience in use.

Also in the image synthesizing method according to the present invention, a document with a plurality of image areas specified therein is read, and image data read from a plurality of other documents is synthesized with the plurality of image areas specified as described above according to a specified order with the sized changed according to a need. This allows the image on the other documents to be allocated with a desired size at an arbitrary position on a particular document and printed on a sheet of recording paper, thus substantially improving the work efficiency and convenience in use.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image synthesizing method, comprising the steps of:
   inputting a page containing a region designated as being for an image;
   inputting image information which is to be incorporated into the page; and
   electronically synthesizing the image information with the page by including the image information into the region to form a synthesized image on the page,
   said method further comprising the step of:
   automatically designating the step of electronically synthesizing is to be performed by detecting characteristics of the page.

2. A method according to claim 1, wherein:
   said step of inputting a page includes optically reading the page; and
   said step of inputting image information optically reads the image information.

3. A method according to claim 1, wherein:
   said step of inputting a page containing a region designated for an image comprises inputting a page containing a plurality of regions designated as being for a plurality of images; and
   said step of inputting image information inputs a plurality of images,
   said method further comprising the step of:
   determining positions on the page for said plurality of images of the image information which correspond to the plurality of regions,
   wherein said step of electronically synthesizing includes electronically synthesizing the image information which includes said plurality of images using the positions determined by the determining step to include the plurality of images into the positions.

4. A method according to claim 3, wherein:
   said determining step determines the positions of said plurality of images by inputting an order of said plurality of images.

5. A method according to claim 1, wherein the step of automatically designating is performed by detecting characteristics of the page which include a bar code on the page.

6. A method according to claim 1, wherein said electronically synthesizing step adjusts a size of the image information so that the image information will fit in a predetermined region on the page.

7. A method according to claim 6, wherein said electronically synthesizing step adjusts the size of the image information by changing at least one dimension of the image information.

8. A method according to claim 7, wherein said electronically synthesizing step adjusts the size of the image information by changing two dimensions of the image information.

9. A method according to claim 6, wherein said electronically synthesizing step adjusts the size of the image information such that one dimension of the image information is changed by an amount which is more than another dimension of the image information is changed.

10. A method according to claim 6, wherein said electronically synthesizing step adjusts the size of the image information by adding a blank section to the image information.

11. A method according to claim 1, further comprising, performed after the step of inputting the page and before the step of electronically synthesizing, the steps of:
 displaying the page; and
 selecting, by a user, a position on the page at which the image information is to be incorporated.

12. A method according to claim 11, wherein:
 the step of displaying the page displays the page on a display which is sensitive to touch; and
 the step of selecting is performed by the user pressing the display which is sensitive to touch.

13. A method according to claim 1, wherein:
 said step of inputting image information includes optically reading an image page containing a plurality of images,
 said method further comprising the step of:
  recognizing at least one of said plurality of images as being designated for synthesizing by reading markings around said one of said plurality of images which indicate that said one of said plurality of images is to be designated.

14. An image synthesizing method, comprising the steps of:
 inputting a page containing a region designated as being for an image;
 inputting image information which is to be incorporated into the page; and
 electronically synthesizing the image information with the page by including the image information into the region to form a synthesized image on the page,
 wherein:
  said step of inputting a page containing a region designated for an image comprises inputting a page containing a plurality of regions designated as being for a plurality of images; and
  said step of inputting image information inputs a plurality of images,
  said method further comprising the step of:
   determining positions on the page for said plurality of images of the image information which correspond to the plurality of regions,
   wherein said step of electronically synthesizing includes electronically synthesizing the image information which includes said plurality of images using the positions determined by the determining step to include the plurality of images into the positions, and
   wherein said determining step determines the positions of said plurality of images by recognizing positions and sizes of a plurality of image areas previously specified on the page.

15. A method according to claim 14, wherein:
 said step of electronically synthesizing includes changing sizes of the plurality of images to match the sizes of a corresponding one of the plurality of image areas.

16. A method according to claim 14, wherein:
 said step of inputting image information includes optically reading an image page containing the plurality of images,
 said method further comprising the step of:
  recognizing at least one of said plurality of images as being designated for synthesizing by reading markings around said one of said plurality of images which indicate that said one of said plurality of images is to be designated.

17. An image synthesizing apparatus, comprising:
 means for inputting a page containing a region designated as being for an image;
 means for inputting image information which is to be incorporated into the page;
 means for electronically synthesizing the image information with the page by including the image information into the region to form a synthesized image on the page; and
 means for automatically designating the means for electronically synthesizing is to operate by detecting characteristics of the page.

18. An apparatus according to claim 17, wherein:
 said means for inputting a page and said means for inputting image information is an optical reader.

19. An apparatus according to claim 17, wherein:
 said means for inputting a page containing a region designated for an image comprises means for inputting a page containing a plurality of regions designated as being for a plurality of images; and
 said means for inputting image information inputs a plurality of images,
 said apparatus further comprising:
  means for determining positions on the page for said plurality of images of the image information which correspond to the plurality of regions,
  wherein said means for electronically synthesizing includes means for electronically synthesizing the image information which includes said plurality of images using the positions determined by the means for determining to include the plurality of images into the positions.

20. An apparatus according to claim 19, wherein:
 said means for determining determines the positions of said plurality of images by inputting an order of said plurality of images.

21. An apparatus according to claim 17, further comprising:
 a key for manually designating the means for electronically synthesizing is to operate.

22. An apparatus according to claim 21, wherein:
 said means for inputting the page is a first means to input image information after said key is pressed.

23. An apparatus according to claim 17, wherein the means for automatically designating operates by detecting characteristics of the page which include a bar code on the page.

24. An apparatus according to claim 17, wherein said means for electronically synthesizing adjusts a size of the image information so that the image information will fit in a predetermined region on the page.

25. An apparatus according to claim 24, wherein said means for electronically synthesizing adjusts the size of the image information by changing at least one dimension of the image information.

26. An apparatus according to claim 25, wherein said means for electronically synthesizing adjusts the size of the image information by changing two dimensions of the image information.

27. An apparatus according to claim 24, wherein said means for electronically synthesizing adjusts the size of the image information such that one dimension of the image information is changed by an amount which is more than another dimension of the image information is changed.

28. An apparatus according to claim 24, wherein said means for electronically synthesizing adjusts the size of the image information by adding a blank section to the image information.

29. An apparatus according to claim 17, further comprising:

a display for displaying the page; and means for selecting, by a user, a position on the page at which the image information is to be incorporated.

30. An apparatus according to claim 29, wherein the display and the means for selecting include a display which is sensitive to touch.

31. An image synthesizing apparatus according to claim 17, wherein:

said means for inputting image information includes means for optically reading an image page containing a plurality of images, said apparatus further comprising:

means for recognizing at least one of said plurality of images as being designated for synthesizing by reading markings around said one of said plurality of images which indicate that said one of said plurality of images is to be designated.

32. An image synthesizing apparatus, comprising:

means for inputting a page containing a region designated as being for an image;

means for inputting image information which is to be incorporated into the page; and means for electronically synthesizing the image information with the page by including the image information into the region to form a synthesized image on the page, wherein:

said means for inputting a page containing a region designated for an image comprises means for inputting a page containing a plurality of regions designated as being for a plurality of images; and said means for inputting image information inputs a plurality of images, said apparatus further comprising:

means for determining positions on the page for said plurality of images of the image information which correspond to the plurality of regions, wherein said means for electronically synthesizing includes means for electronically synthesizing the image information which includes said plurality of images using the positions determined by the means for determining to include the plurality of images into the positions, and wherein said means for determining determines the positions of said plurality of images by recognizing positions and sizes of a plurality of image areas previously specified on the page.

33. An apparatus according to claim 32, wherein:

means for electronically synthesizing includes means for changing sizes of the plurality of images to match the sizes of a corresponding one of the plurality of image areas.

34. An image synthesizing apparatus according to claim 32, further comprising:

means for recognizing at least one of said plurality of images as being designated for synthesizing by reading markings around said one of said plurality of images which indicate that said one of said plurality of images is to be designated.

* * * * *